3,193,089
CONVEYOR CONTROL
Arthur E. Williams, Natick, Mass., assignor to John E. Williams & Son, Inc., Newton Highlands, Mass., a corporation of Massachusetts
Filed June 26, 1963, Ser. No. 290,656
5 Claims. (Cl. 198—232)

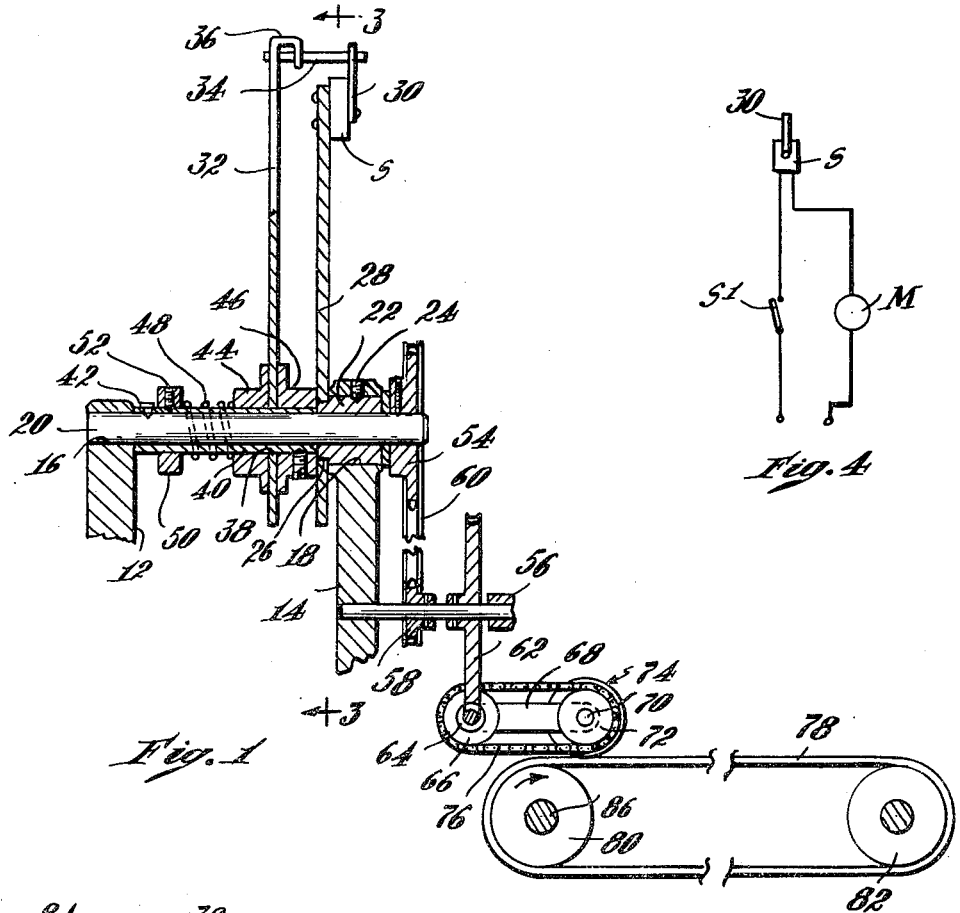

This invention relates to conveyors and has for its principal objects to provide means for controlling the movement of a conveyor to enable stopping it at a predetermined point to permit unloading or loading; to provide control means which may be selectively preset to enable stopping the conveyor at any desired point throughout its path of movement; to provide control means which enables restarting the conveyor at any given point after it has been brought to a stop to cause it to move a further distance and then to be automatically stopped in accordance with the new setting; and to provide a conveyor control which is relatively simple in construction, comprises a minimum number of operating components, is reliable, does not require precise adjustment or upkeep and which may be applied to conveyors of the endless or intermittent type without material modification.

As herein illustrated, the control is employed in combination with a conveyor, including driving means for effecting its movement, and means operable to terminate operation of the driving means; comprising means movable in proportion to the movement of the conveyor adapted to be preset to effect operation of the means operable to terminate operation of the driving means when the conveyor has moved a predetermined distance. The means operable to terminate operation of the driving means, as herein illustrated, is a switch and there is a switch actuator adjustable relative to the switch and movable toward the switch to effect operation of the latter in proportion to the movement of the conveyor. The means for effecting movement of the actuator comprises mechanism operably connected to the actuator and including a follower movable in proportion to the movement of the conveyor which, in the preferred form, is a wheel supported for contact with a run of the conveyor. The switch is of the "off" and "on" type operable, when engaged by the actuator to interrupt the circuit to the driving means thereby to stop the conveyor and to re-establish the circuit when the actuator is disengaged. The actuator is variably adjustable relative to the switch to enable starting and stopping the conveyor at any time that it is desired and at whatever point is desired throughout its length. Alternatively, a follow-up mechanism may be employed, such as a selsyn, wherein one component is driven by the drive shaft of the conveyor and the other component effects movement of the actuator relative to the control switch.

The invention will now be described in greater detail with reference to the accompanying drawings wherein:

FIG. 1 is a section through the control shown in combination with an endless conveyor, the latter being illustrated in elevation but broken away intermediate its ends;

FIG. 2 is a plan view of the conveyor showing the follower of the control resting on the upper run;

FIG. 3 is an elevation taken on the line 3—3 of FIG. 1, showing the support for the switch and the switch actuator disposed in angular relation to each other and showing the direction of movement of the actuator toward the switch for stopping the conveyor when the actuator has moved through the angular distance between it and the switch support;

FIG. 4 is a diagram of the electric circuit; and

FIG. 5 is a diagram of an alternative form of the invention.

As herein illustrated, the control and its operating mechanism is supported by brackets, parts of which are shown at 12 and 14, adapted to be attached to the conveyor-supporting frame or to a wall or other means adjacent the conveyor and preferably adjacent the end of the conveyor which is to be loaded for transmission of an article or articles from the place of loading to some other point for use. The parts 12 and 14 contain aligned openings 16 and 18 for receiving a shaft 20, the portion of the shaft 20 extending through the opening 18 being supported therein by a bushing 22 non-rotatably secured within the opening by a set screw 24.

The bushing 22 has at one end an annular shoulder 26 upon which is mounted and fixed a supporting arm 28 which extends radially from the axis of the shaft 20 and has attached to its outer end a control switch S having a switch arm 30. The switch S comprises part of a motor circuit (FIG. 4) in which there is a motor M for driving the conveyor and a main switch S1 for supplying current to the circuit. When the switch S1 is closed, the conveyor will be driven continuously except when stopped by the control switch.

Control is effected by an actuator arm 32 mounted for angular movement relative to the switch-supporting arm 28 about the axis of the shaft 20 and for rotation with the shaft 20 from a displaced position to a position in registration with the switch-supporting arm 32, so as to effect actuation of the switch arm 30. The switch arm 30 is actuated by a pin 34 fixed in the outer end of the actuator arm 32, the latter being bent at its end to provide a U-shaped bracket 36, the parallel portions of which are apertured to receive the pin 34.

The proximal end of the actuator arm 32 contains an opening 38 for rotatably receiving a sleeve 40 mounted on the shaft 20 between the bracket part 12 and the bushing 22, and secured to the shaft 20 for rotation therewith by a set screw 42. Bearing collars 44 and 46 are mounted on the sleeve at opposite sides of the arm 32 for holding the actuator arm 32 parallel to the switch supporting arm 28 throughout movement relative thereto. The collar 46 is fixed to the sleeve. A coiled spring 48 is mounted on the sleeve with one end bearing on the bearing element 44 and the other bearing on a collar 50 adjustably mounted on the sleeve by a set screw 52. The spring 58, through the collar 44, yieldably forces the proximal end of the arm 32 against the bearing 46 and since the latter is fixed to the sleeve and hence rotatable with the shaft 20, the arm 32 will normally turn with the shaft 20. The drive is purely frictional and hence it is possible to rotate the actuator arm 32 relative to the shaft 20 and set it at any predetermined angular distance from the switch-supporting arm 28.

The shaft 20 has on the end adjacent the supporting part 14 a sprocket 54. The part 14 supports a countershaft 56 on which there is a sprocket 58 and a chain 60 is entrained about the sprockets 54 and 58. The countershaft has fixed to it a worm wheel 62, the latter meshing with a worm 64 on which there is a sprocket 66 and a pivotally supported arm 68. The distal end of the arm 68 has on it a shaft 70, to one end of which is fixed a sprocket 72 and to the other end of which is fixed a wheel 74. A chain 76 is entrained about the sprockets 66 and 72 and the wheel 74 rests on the upper run 78 of an endless conveyor, the ends of which are shown entrained about pulleys 80 and 82, one of which is driven through suitable connections by the motor M.

The wheel 74 will be turned by movement of the upper run 78 of the conveyor and, through the driving connections referred to above, will effect rotation of the shaft 20 and hence an angular movement of the actuator arm 32 relative to the switch-supporting arm 28. By properly proportioning the driving elements, the actuator arm 32 may be caused to move in a predetermined relation to the movement of the conveyor so as to contact the switch S, interrupt the motor circuit and thus stop the conveyor at a predetermined point. By employing an "off" and "on" switch S, the conveyor may be immediately restarted wherever it has been stopped by rotating the actuator arm 32 away from the switch-supporting arm 28 to disengage the pin 34 from the switch arm 30. The conveyor will then continue to operate until the actuator arm 32 is again moved to a position to actuate the switch S. It is apparent by this construction that it is possible to stop and start the conveyor as many times as is desired and in whatever position desired and it is possible, by providing a scale 84 adjacent the actuator arm 32, to preset the control to bring the conveyor to a halt at a predetermined position.

The positioning of the wheel 74 on the upper run of the conveyor is illustrative only of one way of effecting actuation of the control in proportion to the movement of the conveyor. Other and equivalent driving means may be employed; for example, the wheel 74 may be driven by contact with the periphery of the pulley 80 or by contact with the shaft 86 supporting the pulley 80.

The foregoing means is mechanical in its construction and operation, however, it is within the scope of the invention to employ electrical means, to wit, follower mechanism such as a selsyn (FIG. 5), one component 88 of which is rotatable with the shaft 86 of the conveyor and the other 90 of which takes the place of the wheel 74, so that rotation of the components of the selsyn produces angular movement of an actuator arm 32a relative to a switch Sa. Such an arrangement is diagrammatically indicated in FIG. 4 and constitutes a much simplified form of control since the actuator arm 32a may be secured directly to the shaft of the component 90 and be moved toward the switch Sa by operation of the components and relative thereto to establish a predetermined setting.

It should be understood that the present disclosure is for the purpose of illustration only and that this invention includes all modifications and equivalents which fall within the scope of the appended claims.

I claim:

1. The combination with a conveyor including driving means for effecting movement thereof, a support, a starting switch fixed to the support, a switch actuator mounted on the support for movement relative to the starting switch to initiate operation of the driving means, the displacement of said switch actuator determining the distance of movement of the conveyor, a first shaft rotatably mounted on the support, a first sprocket fixed to said first shaft to effect its rotation, a countershaft mounted on the support, a second sprocket fixed to said countershaft, a chain entrained about said sprockets, a worm wheel on said countershaft, a second shaft supported adjacent the conveyor having a worm on it engaged with said worm wheel, a third sprocket on it, and an arm pivoted at one end thereto, a fourth sprocket and a wheel rotatably mounted at the distal end of the arm with the wheel engaged with one of the runs of the conveyor, and a chain entrained about the third and fourth sprockets whereby rotation of the wheel effects rotation of the second shaft, the second shaft effects rotation of the countershaft, and the countershaft effects rotation of the first shaft to return the switch actuator to its initial position.

2. Apparatus according to claim 1, wherein a first arm on the first shaft non-rotatably supports the switch, a second arm on the shaft rotatably supports the switch actuator, and there is a friction clutch in the form of a first disc rotatable with the first shaft, a second disc rotatable on the first shaft, and a spring operable by engagement with the rotatable disc frictionally to press the second arm between the discs so as to effect rotation of the second arm with the shaft while permitting the second arm to be manually adjusted relative to the first arm to position it at a predetermined angular distance from the switch.

3. Apparatus according to claim 1, wherein there is a sleeve on the first shaft, means fixing the sleeve to the first shaft for rotation therewith, a first arm on the first shaft non-rotatably supporting the starting switch, a pair of friction discs mounted on the sleeve, one of which is keyed to the sleeve and the other of which is rotatable relative to the sleeve, a second arm rotatably mounted on the sleeve between the discs supporting the switch actuator, a collar on the sleeve, a coiled spring disposed between the collar and one of the friction discs operable to press the one disc against the arm and the latter against the other disc so as frictionally to rotate the second arm with the shaft, and means for adjusting the collar lengthwise of the sleeve to adjust the compression of the spring.

4. The combination with a conveyor supported for movement along a predetermined path, a motor for effecting its movement, a switch operably connected to the motor for initiating and terminating operation of the motor and a switch-actuator; characterized in that there is means mounting the switch and switch-actuator for relative movement from an inoperative position in contact with each other to an operative position spaced from each other and wherein said space between them at any time is proportionately determinative of the distance the conveyor will travel until the motor is stopped by relative movement of the switch and switch-actuator to said initial inoperative position, and that initiation of the operation, as well as the duration of operation of the motor, is effected by the relative movement of the switch and switch-actuator.

5. The combination according to claim 4, further characterized in that there is means operably connected to the conveyor operable to return the switch and switch-actuator to their initial inoperative position relative to each other as the conveyor travels said distance.

References Cited by the Examiner

UNITED STATES PATENTS

| 1,335,980 | 4/20 | Mills | 198—232 X |
| 1,846,083 | 2/32 | Bowker | 198—232 |
| 2,983,393 | 3/58 | Campbell | 214—16.4 |
| 3,138,235 | 6/64 | Collette | 198—40 |

SAMUEL F. COLEMAN, *Primary Examiner.*

WILLIAM B. LABORDE, *Examiner.*